Aug. 16, 1960 — T. L. ABBOTT — 2,949,198
LOADING DEVICE
Filed Dec. 9, 1957 — 2 Sheets-Sheet 1
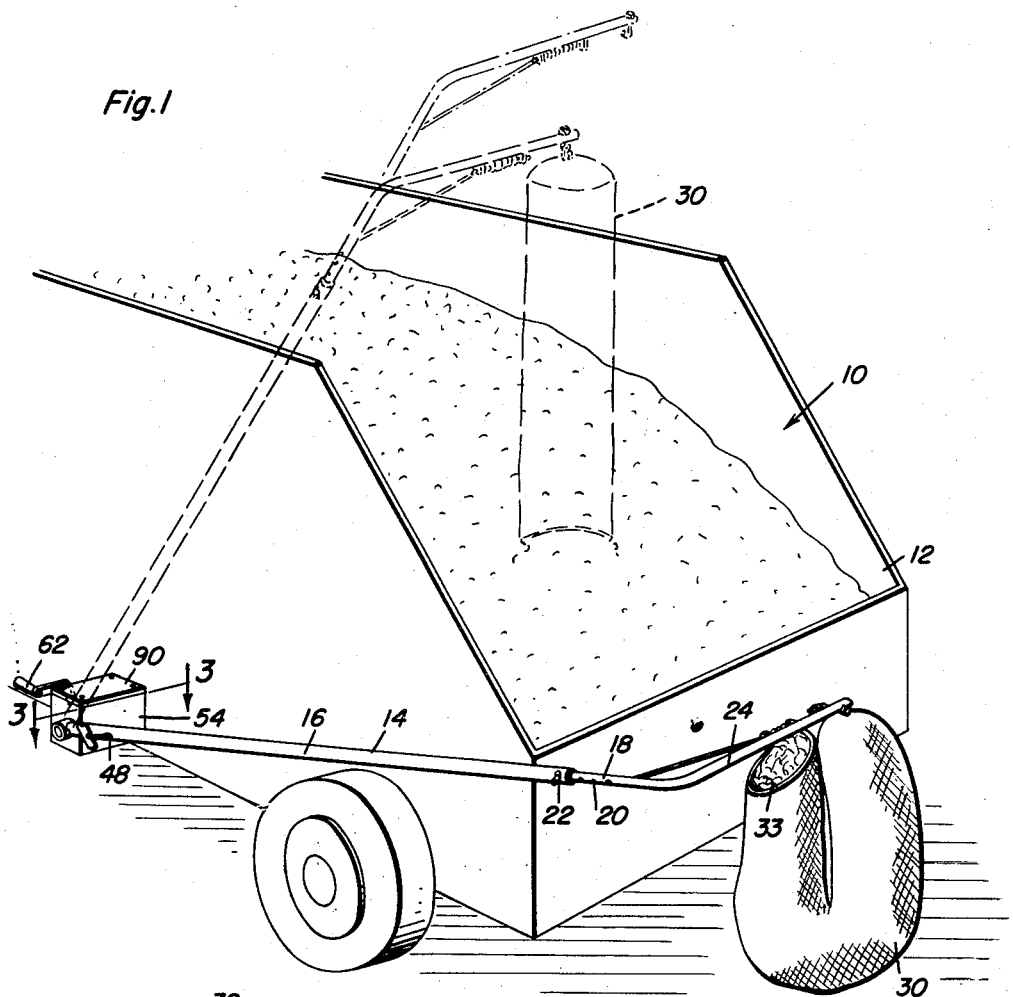
Fig.1
Fig.2
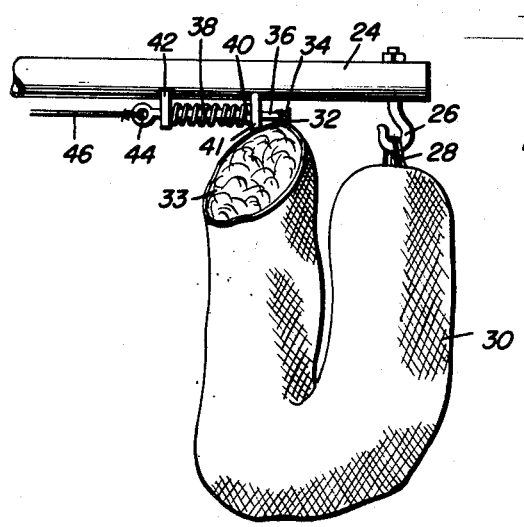
Tom L. Abbott
INVENTOR.

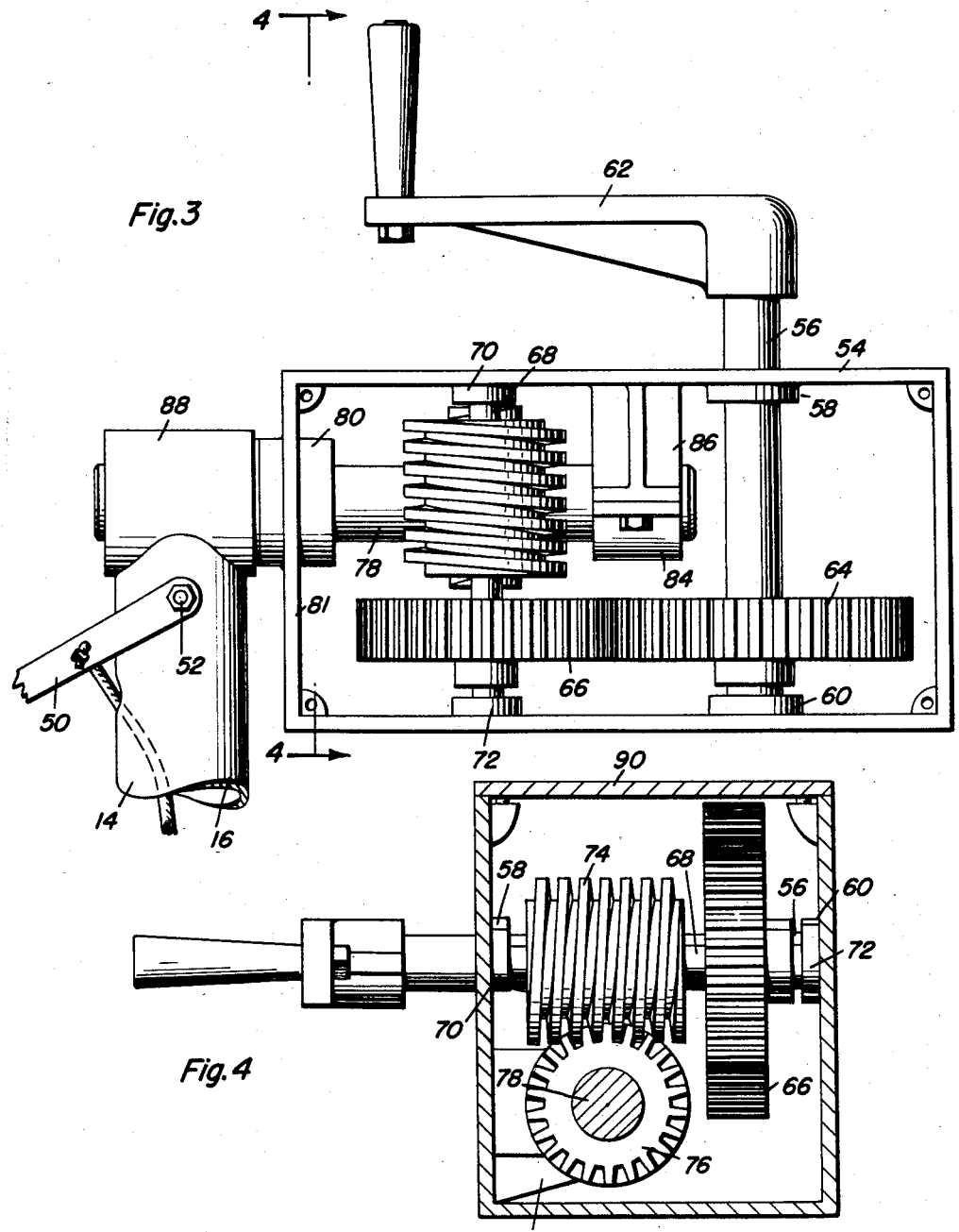

United States Patent Office 2,949,198
Patented Aug. 16, 1960

2,949,198

LOADING DEVICE

Tom L. Abbott, Rte. 3, Levelland, Tex.

Filed Dec. 9, 1957, Ser. No. 701,509

3 Claims. (Cl. 214—77)

This invention relates to a device to facilitate the loading of cotton and is constructed particularly for hand picked or pulled cotton that is picked in a sack and brought to a truck or trailer to be weighed and emptied out of the sack.

An object of the invention is to provide a device for facilitating the loading of cotton in a cotton field.

When a truck or trailer is in a cotton field, my invention is attached to the side of a truck or trailer. Then, when a sack of pulled or picked cotton has been brought to the trailer or truck, one end of the sack is secured to a hook by means of an eye. The open end of the sack is attached to a trip device by means of a collar at the open end of the sack. A cable is secured through the lift arm to a release mechanism for the open end of the sack. Mechanical, electrical or hydraulic means are then operated to move the arm to a position over the truck body or trailer body at which the sack is emptied. The sack is then removed with the lift arm and replaced by the next full sack so that the procedure can be repeated.

My invention may be installed as original equipment on a trailer or truck or may be applied as a subsequent attachment. In either case it is preferred that the lift arm be adjustable to account for differences in heights through which the lift arm must travel or to account for different sizes of truck bodies. The attachment may be constructed in an exceedingly simple manner so that the job of lifting and emptying cotton sacks may be repeated time after time without failure or wearing out of parts. Maintenance is either non-existent or negligible in my attachment.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a fragmentary perspective view of a vehicle in which cotton is to be deposited, this typifying a truck or trailer which is used in a cotton field;

Figure 2 is a fragmentary elevational view of an end of the loading device of the invention;

Figure 3 is a sectional view taken on the line 3—3 of Figure 1; and

Figure 4 is a sectional view taken on the line 4—4 of Figure 3.

In the accompanying drawings there is a vehicle 10 which has a body 12. This vehicle schematically represents the trailer or truck that is used in the cotton field. The loading device consists of a lift arm 14. The arm has an inner section 16 and an outer section 18 extensibly connected together. The illustrated sections are telescoped with the inner section being a length of tubing while the outer section 18 is a bar and has a group of holes 20 in it. A removable pin 22 is carried by inner section 16 and is movable into a selected hole 20 so that the combined length of sections of lift arm 14 can be varied in accordance with requirements. Angulated end 24 of the lift arm has a hook 26 within which eye 28 at the end of sack 30 is adapted to be fastened. Another eye 32 is at the open end 33 of sack 30 and is supported in the hook 34 that is formed at the end of sliding bolt 36. This sliding bolt constitutes a part of the means for releasably fastening the open end of the sack 30 in place at the end of the lift arm 14.

The remainder of these means are seen in Figure 2 and consist of spring 38 that seats and reacts on a collar 40 attached to sliding bolt 36 and mounted between depending brackets 41 and 42 which are welded or otherwise rigidly secured to the angulated end 24 of lift arm 14. The opposite end of spring 38 seats and reacts on depending bracket 42 so that the bias of the spring is in a direction tending to push the sliding bolt 36 forward at all times. An eye 44 is at the end of the sliding bolt opposite to the hook 34 and has a cable or rope 46 secured to it. This cable extends through the hollow lift arm 14 by entering an opening near the upper end of the lift arm. It passes through an opening 48 near the inner end of the lift arm and is attached to a trip lever 50 intermediate the inner and outer ends thereof.

The inner end of the trip lever is mounted on a pivot 52 that is carried by the inner section 16 of lift arm 14. Accordingly, when the trip lever is pulled in one direction the rope or cable 46 will be pulled thereby retracting the sliding bolt 36 and sliding the eye 32 from the hook 34 of the sliding bolt. Incidentally, the eyes 32 and 28 can be formed in many ways, among which are the fastening of flexible or rigid rings to the sacks 30 or as shown in Figure 2, placing a reinforcing rim around the open end 33 of the sack and forming an eye in it.

When the worker arrives at the vehicle 10 the sack with its cotton content and applied to the angulated end 24 of the lift arm as illustrated in Figure 2. Then the lift arm is elevated through the intermediate position shown in Figure 1 in dotted lines and to the discharge position as also shown in this figure in dotted lines. The means for so lifting the arm 14 are seen best in Figures 3 and 4. They may be bolted or otherwise fastened to the side or any other convenient location on the vehicle 10. They may assume the nature of an electric motor, hydraulic motor or mechanical gearing in the simplest form of my invention. This is shown in the drawings as consisting of a gear case 54 which is fastened to the side of vehicle 10 and which has shaft 56 mounted in bearings 58 and 60 that are carried by opposite sides of the gear case 54. Shaft 56 has a crank arm 62 separably or preferably attached to shaft 54. A gear 64 is secured to shaft 56 and is enmeshed with gear 66. The last mentioned gear is secured to shaft 68 that is mounted for rotation in bearings 70 and 72 on the same side of case 54 as are bearings 58 and 60. Shaft 68 is parallel to shaft 56. Worm gear 74 is secured to shaft 68 alongside of gear 66. It is enmeshed with the worm wheel 76 on shaft 78. This shaft has an end which protrudes through bearings 80 carried by an end wall 81 of gear case 54. The opposite end of shaft 78 is mounted in a bearing 84 which is attached by pillow block 86 to a wall of gear case 54.

The outer end of shaft 78 is splined, keyed or otherwise rigidly secured to the inner extremity of lift arm 14. A fitting 88, such as a hub, is fixed to the inner end of lift arm 14, and accepts the outer extremity of shaft 78. The key, splines, pins, etc. used to establish a drive connection between the shaft 78 and the lift arm 14 are secured to the hub 88.

The top 90 of the gear case 54 can be separable from the remainder of the gear case in order to lubricate the gears, although this is something which will be necessary only after very long periods of use. It is within the contemplation of the invention to have the gear case sealed with a lubricant therein so that it will be a non-serviced item.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. An attachment for lifting and emptying cotton sacks, comprising, vertically swingable lift means pivotally connected to a cotton field vehicle, extensible arm means connected to said lift means and having a horizontally disposed transverse portion extending transversely across the vehicle, said lift means being operative to raise or lower said arm means while maintaining said transverse portion horizontal, suspension means horizontally spaced on said arm means, said suspension means including a first portion connected to a closed end of a cotton sack and a second portion slidably mounted on the arm means for movement parallel to a horizontal axis through said transverse portion, in a direction transversely across the vehicle, release means extending through said lift means and operatively connected at an upper end to the second portion of the suspension means for moving the second portion to release an open end of the cotton sack for dumping of cotton therein into the vehicle when said arm means has been raised, and actuating means mounted on said lift means and operatively connected to said release means at a lower end thereof.

2. The attachment as defined in claim 1, wherein the first portion of said suspension means includes a hook fixed to said arm means from which the closed end of the cotton sack is suspended and the second portion includes a bolt slidably mounted on said arm means parallel thereto, said release means being connected to said bolt for withdrawal thereof against a spring bias from engagement with a suspension member on the open end of the cotton sack.

3. The attachment as defined in claim 2, wherein said release means includes a cable connected at one end to said bolt and guidingly received and enclosed within said lift means and connected at its lower end to said actuating means comprising a release lever pivotally connected to said lift means.

References Cited in the file of this patent
UNITED STATES PATENTS

| | | |
|---|---|---|
| 798,560 | Bechtolshein | Aug. 29, 1905 |
| 1,214,421 | Brown | Jan. 30, 1917 |
| 2,479,758 | McDermott | Aug. 23, 1949 |
| 2,690,851 | Johnson | Oct. 5, 1954 |